United States Patent [19]
Giraud

[11] Patent Number: 5,661,192
[45] Date of Patent: Aug. 26, 1997

[54] ORGANOPOLYSILOXANE COMPOSITION FOR ELASTOMER FOAM

[75] Inventor: Yves Giraud, Ste-Foy-les-Lyon, France

[73] Assignee: Rhone-Poulenc Chimie, Courbevoie, France

[21] Appl. No.: 722,541

[22] Filed: Sep. 27, 1996

[30] Foreign Application Priority Data

Sep. 29, 1995 [FR] France .................. 95 11687

[51] Int. Cl.$^6$ ..................... C08J 9/08
[52] U.S. Cl. .............. 521/93; 521/97; 521/123; 521/130; 521/154; 521/33
[58] Field of Search ............... 521/93, 97, 123, 521/130, 154

[56] References Cited

U.S. PATENT DOCUMENTS 4,705,810  11/1987  Millet .................. 521/86

FOREIGN PATENT DOCUMENTS

| 0 044 891 | 2/1982 | European Pat. Off. | C08L 83/04 |
| 1 270 725 | 1/1962 | France . | |
| 12 45 124 | 7/1967 | Germany . | |
| 887905 | 1/1962 | United Kingdom . | |

*Primary Examiner*—Morton Foelak
*Attorney, Agent, or Firm*—Andrew M. Solomon

[57] ABSTRACT

In an organopolysiloxane composition giving rise to elastomer foam, including at least one polyacyloxyorganopolysiloxane obtained by functionalization, with a polyacyloxysilane, of at least one reactive oil which is a polyhydroxylated polysiloxane intended to react in the presence of water to form the elastomer with formation of acid of formula R'COOH, in which R' denotes a hydrocarbon radical free from aliphatic unsaturation and which has from 1 to 15 carbon atoms, a blowing agent and optionally water, the blowing agent is at least one acidic or neutral carbonate of an alkali or alkaline-earth metal, which, by reacting with the acid R'COOH, gives carbon dioxide and preferably water.

Objects, especially seals, thus obtained and kit for static mixing.

23 Claims, 1 Drawing Sheet

FUNCTIONALIZATION OF THE PDMS

Me=CH₃   Ac=CH₃CO

PRODUCT STORAGE

CROSSLINKING ON CONTACT WITH ATMOSPHERIC MOISTURE

ORGANOPOLYSILOXANE COMPOSITION FOR ELASTOMER FOAM

The present invention relates to new organopolysiloxane compositions intended to give rise to an elastomer foam. The present invention also has as its subject a process permitting their manufacture and the elastomer foams obtained.

In the industrial field, the characteristics sought after in a silicone foam are the following:

ease of processing (at low temperature with or without subsequent heat treatment, with or without a dynamic mixer, if possible)

preparation of a closed-cell foam relative density of between 0.3 and 0.7 low hardness (from 20 to 60 SHORE 00—lower than or in the order of 5 SHORE A)

mechanical properties (in particular tear strength)

adhesiveness (in particular to plastics)

low residual compression set (at ambient temperature and in respect of temperature)

good heat behaviour good chemical resistance (behaviour towards oils and the like)

good resistance to the UV good behaviour towards fire (a characteristic valid above all in the case of applications in the building industry field).

In the majority of cases silicone foams are obtained:

1) Chemically, by employing the SiH-SiOH reaction which allows hydrogen to be released. To exhibit acceptable characteristics, the foams thus obtained make it necessary to employ a dynamic mixer and even then the uniformity of the foaming is quite tricky to ensure. The cost of products of this type is relatively high.

2) Mechanically, by introducing a gas (nitrogen) into the single-component product under pressure and passing through a dynamic mixer. This technique allows access to foams which have good characteristics, but they require very heavy and costly equipment.

3) Chemically, by employing a blowing agent of the azodicarbonamide type, which will allow nitrogen, carbon dioxide and aqueous ammonia to be released. Despite the fact that it is very widely employed for other materials, this type of blowing agent presents severe toxicity problems (release of hydrazine).

Other techniques exist, such as microwaves (U.S. Pat No. 4,026,844), and the use of a calcium carbonate with carboxylic acid (EP-A-235 052).

Out of the three types of techniques referred to above, the first one (SiH-SiOH) is the most widely employed.

Apart from the problem of toxicology, the use of a blowing agent based on thermal decomposition is very tricky to implement because it makes a heat treatment necessary. This technique is very often reserved for the elastomers that can be vulcanized when heated. Chemical decomposition of the blowing agents can also be induced (since azodicarbonamide decomposes in the presence of NaOH and of metal salts). This technique is rarely employed in the case of silicones.

Another blowing agent, sodium bicarbonate, has been employed since 1941 for elastomer expansion based on thermal decomposition. It was widely employed, and remains employed, in the case of natural rubber and of SBR (stytens butadiene rubber), for applications such as carpet-backing foams and also for the manufacture of rigid PVC sections for applications such as window frames. Today it is replaced with blowing agents such as azodicarbonamide. Sodium bicarbonate is also employed as flame retardant, especially in the case of polyester resins. Furthermore, EP-A-235 052 has proposed to use calcium carbonate and carboxylic acid in combination for decomposition at ambient or higher temperature for polyaddition elastomers that can be vulcanized cold.

The objective of the present invention is to provide a means for ensuring the foaming of the polycondensation compositions that can be vulcanized cold, the foaming having to ensure the securing of the characteristics expected of a silicone foam.

Another objective of the invention is to provide such a means which can be processed equally well in a static mixer and in a dynamic mixer.

Yet another objective of the invention is to provide such a means which is simple and easy to process and which is low in cost.

The Applicant Company has now found, very surprisingly, that the use of sodium bicarbonate within an organopolysiloxane composition including a polyacetoxyorganopolysiloxane, a product of the reaction between an $\alpha,\omega$-hydroxylated polydimethylsiloxane oil and the methyltriacetoxysilane crosslinking agent, allows water to be generated in situ, consequently producing rapid and homogeneous crosslinking and, on the other hand, foaming to be produced by virtue of the carbon dioxide released during the reaction. The reaction mechanism would appear to be the following:

$$CO_3HNa + CH_3COOH \rightarrow CH_3COONa + CO_2 + H_2O.$$

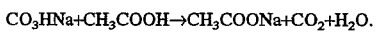

The reaction is fed with acetic acid by the hydrolysis of the acetoxy functional groups of the oil. The reaction is noteworthy in that the foaming and an acceleration of the crosslinking are obtained.

The Applicant Company has also found that this principle can be extended to the compositions in which the crosslinking agent is more generally a polyacyloxysilane. Similarly, the Applicant Company has found that it is possible to extend this principle to the acidic or neutral carbonates of an alkali or alkaline-earth metal which, on reacting with an acyloxy acid, produces carbon dioxide and water. Similarly, this principle may be extended to those of the carbonates whose reaction does not produce water; in this case, an external water input allows the input needed for the hydrolysis of the acyloxy functional groups to be ensured.

The invention makes it possible to overcome the disadvantages and inadequacies of the previous foaming systems and to produce optimum crosslinking conditions at ambient temperature and foams which have the characteristics expected of the industrial silicone foams and most particularly of the seals employed in a severe thermal environment. In addition, the invention is noteworthy in that it requires only one additional reactant, exploiting the elastomeric composition itself.

The subject of the present invention is therefore an organopolysiloxane composition giving rise to elastomer foam, including at least one polyacyloxyorganopolysiloxane obtained by functionalization, with a polyacyloxysilane, of at least one reactive oil which is a polyhydroxylated polysiloxane intended to react in the presence of water to form the elastomer with formation of acid of formula R'COOH, in which R' denotes a hydrocarbon radical free from aliphatic unsaturation, which has from 1 to 15 carbon atoms, the composition also including a blowing agent and optionally water, the composition including, as blowing agent, at least one acidic or neutral carbonate of an alkali or alkaline-earth metal which, on reacting with the acid R'COOH, gives carbon dioxide and preferably water. It is preferred that the blowing agent should be a bicarbonate and preferably sodium bicarbonate. Bicarbonates or hydrogen carbonates are preferred insofar as they result in the production of carbon dioxide and of water when they react with the acid R'COOH, this generation of water in situ making it possible very advantageously to obtain fast and homogeneous crosslinking while the generation of the foaming takes place by virtue of the carbon dioxide released during the above-mentioned reaction.

The carbonate, advantageously bicarbonate, is preferably hydrated, especially in a proportion of 0.01 to 20% by weight of water, preferably of 0.1 to 3%. For this purpose water may be added to the carbonate before the latter is introduced into the composition, in order to adjust the degree of hydration of the carbonate to the desired value. In the case of carbonates which do not lead to the formation of water in situ, high values of the range from 0.01 to 20% are more likely to apply.

In general, the composition will include from 1 to 50% by weight of carbonate relative to the total composition, preferably from 10 to 35% by weight. Similarly, the particle size of the carbonate may be especially between 5 and 100 μm, preferably between 20 and 30 μm, in particular of the order of 25 μm. Suitable sodium bicarbonates whose purity is generally higher than 99% are to be found in the trade.

The Applicant Company has found that it is preferable to have a large excess of crosslinking agent available, for two major reasons:

this makes it possible to give rise to more acid R'COOH when brought into contact with the carbonate, preferably bicarbonate, and hence to induce foaming and crosslinking which are faster and more effective;

this additionally makes it possible to employ a reactive oil with hydroxyl functional groups in order to turn the carbonate, preferably bicarbonate, into a "paste". The use of an unreactive oil, which presents disadvantages with regard to the properties of the foam obtained, and especially to exudation, are therefore advantageously avoided. Furthermore, in the case where the composition according to the invention will be in two parts, namely a part A including the polyacyloxyorganopolysiloxane obtained from the polyhydroxylated polysiloxane and from the crosslinking agent, and a part B including the carbonate and this reactive oil, the latter, when parts A and B are being mixed, will be capable of being very advantageously functionalized by the remaining crosslinking agent and thus at the same time taking part in the elastomeric network and giving rise to an initial quantity of acid R'COOH which will allow the reaction with the carbonate to be started.

Consequently, according to the invention, the polyacyloxyorganopolysiloxane is preferably obtained by functionalization of the polyhydroxylated polysiloxane with a polyacyloxysilane in conditions such that the molar ratio of acyloxy functional groups of the crosslinking agent/hydroxyl functional groups of the polyhydroxylated polysiloxane is higher than 1, preferably between 2 and 10.

The crosslinking agents according to the invention are preferably at least one compound corresponding to the formula

in which the symbol R denotes a hydrocarbon radical containing from 1 to 8 carbon atoms which are optionally substituted by halogen atoms or cyano groups and the symbol R' denotes a hydrocarbon radical free from aliphatic unsaturation, containing from 1 to 15 carbon atoms, and the symbol p being 0 or 1.

The hydrocarbon radicals R, containing from 1 to 8 carbon atoms, optionally substituted by halogen atoms or cyano groups, may be preferably chosen from:

alkyl and haloalkyl radicals containing from 1 to 8 carbon atoms, such as methyl, ethyl, n-propyl, isopropyl, n-butyl, n-pentyl, n-hexyl, 2-ethylhexyl, n-octyl, 3,3,3-trifluoropropyl, 4,4,4-trifluorobutyl and 4,4,4,3,3-pentafluorobutyl radicals, cycloalkyl and halocycloalkyl radicals containing from 4 to 8 carbon atoms, such as the cyclopentyl, cyclohexyl, methylcyclohexyl, 2,3-difluorocyclobutyl and 3,4-difluoro-5-methylcycloheptyl radicals, alkenyl radicals containing from 2 to 4 carbon atoms, such as the vinyl, allyl and 2-butenyl radicals, aryl and haloaryl radicals containing from 6 to 8 carbon atoms, such as the phenyl, tolyl, xylyl, chlorophenyl, dichlorophenyl and trichlorophenyl radicals, cyanoalkyl radicals in which the alkyl chain units contain from 2 to 3 carbon atoms, such as the β-cyanoethyl and γ-cyanopropyl radicals.

As for the symbol R', this denotes a radical chosen from the group consisting:

of alkyl radicals containing from 1 to 15 carbon atoms, such as the methyl, ethyl, n-propyl, n-butyl, n-pentyl, 1-ethylpentyl, n-hexyl, 2-ethylhexyl, n-octyl, neodecyl, n-decyl, n-dodecyl and n-pentadecyl radicals of cycloalkyl radicals containing from 5 to 6 nuclear carbon atoms, such as the cyclopentyl and cyclohexyl radicals of aryl radicals containing from 6 to 8 carbon atoms, such as the phenyl, tolyl and xylyl radicals.

By way of examples of crosslinking agents there may be mentioned those corresponding to the following formulae:

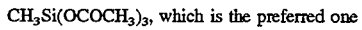

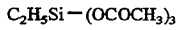

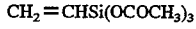

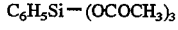

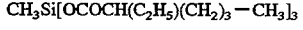

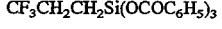

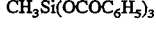

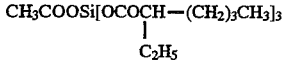

Silanes each of which carries only two hydrolysable groups may be used in combination with these crosslinking agents; these silanes correspond to the formula

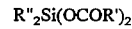

in which the symbols R' have the meaning of the symbol R' of the formula

and the symbols R" have the meaning of the symbol R of this same formula or denote a tert-butoxy radical of formula $(CH_3)_3C\!-\!O\!-\!$.

By way of examples of these silanes there may be mentioned those of the following formulae:

(CH$_3$)$_2$Si(OCOCH$_3$)$_2$
CH$_2$=CH (CH$_3$)Si(OCOCH$_3$)$_2$
(C$_6$H$_5$)$_2$Si(OCOCH$_3$)$_2$
[(CH$_3$)$_3$C—O]$_2$Si(OCOCH$_3$)$_2$
(CH$_3$)$_2$Si[OCOCH(C$_2$H$_5$) (CH$_2$)$_3$CH$_3$]$_2$
[(CH$_3$)$_3$CO]$_2$Si[OCOCH(C$_2$H$_5$)(CH$_2$)$_3$CH$_3$]$_2$

The molar quantity which is used, of the silanes of formula R"$_2$Si(OCOR')$_2$, in relation to that used of the crosslinking silanes of formula R$_p$Si(OCOR')$_{4-p}$ is not strictly defined; it is necessary, however, that it should have an upper limit so that the mixture of the two types of silanes always contains on average at least 2.5 —OCOR' groups per silicon atom.

Thus, taking, for example, 1 mole of the crosslinking silane of formula RSi(OCOR')$_3$ (with p=1), this must be used in combination with not more than 1 mole of the silane R"$_2$Si(OCOR')$_2$; similarly, taking 1 mole of the crosslinking silane of formula Si(OCOR')$_4$ (with p=0), this must be used in combination with not more than 3 moles of silane R"$_2$Si(OCOR')$_2$.

The main purpose of the silanes of formula R"$_2$Si (OCOR')$_2$ is to couple the chains of the polysiloxane polymers (especially α,ω-di(hydroxy)di-organopolysiloxane polymers), and this makes it possible to obtain elastomers which have good physical characteristics by starting from compositions containing polymers whose viscosity is relatively low, for example ranging from 200 to 5 000 mPa s at 25° C.

Quite preferably, the crosslinking agent is at least one polyacetoxysilane, preferably methyl- and/or ethyltriacetoxysilane, with a view to the formation of an acetic elastomer.

In a manner which is preferred according to the invention, the starting polyhydroxylated polysiloxane is at least one α,ω-di(hydroxy)di-organopolysiloxane oil of viscosity between 200 and 1,000,000 mPa s at 25° C., preferably between 500 and 200,000, consisting of a succession of diorganosiloxy units of R$_2$SiO unit, where the symbols R, which are identical or different, denote hydrocarbon radicals containing from 1 to 8 carbon atoms optionally substituted by halogen atoms or cyano groups and optionally with monoorganosiloxy units of formula RSiO$_{1.5}$ and/or siloxy units of formula SiO$_2$, in the proportion of not more than 2% relative to the number of diorganosiloxy units.

The hydrocarbon radicals R are preferably as defined above in the context of the description of the crosslinking agents according to the invention.

By way of example of units denoted by the formula R$_2$SiO there may be mentioned those of formulae:

(CH$_3$)$_2$SiO
CH$_3$(CH$_2$=CH)SiO
CH$_3$(C$_6$H$_5$)SiO
(C$_6$H$_5$)$_2$SiO
CF$_3$CH$_2$CH$_2$(CH$_3$)SiO
NC—CH$_2$CH$_2$(CH$_3$)SiO
NC1'CH(CH$_3$)CH$_2$(CH2=CH)SiO
NC—$_2$CH$_2$CH$_2$CH$_2$(C$_6$H$_5$)SiO

It must be understood, according to an alternative form of the invention, that it is possible to employ, as polymers, copolymers or a mixture of α,ω-di(hydroxy) diorganopolysiloxane polymers which differ from each other in molecular weight and/or the nature of the groups bonded to the silicon atoms.

These α,ω-di (hydroxy) diorganopolysiloxane copolymers are marketed; in addition, they can be easily manufactured. One of the most common techniques of manufacture consists, in a first stage, in polymerizing diorganocyclopolysiloxanes with the aid of catalytic quantities of alkaline or acidic agents and in then treating the polymerizates with calculated quantities of water (French patents FR-A-1 134 005, FR-A-1 198 749 and FR-A-1 226 745); this added quantity of water, which is proportionately greater the lower the viscosity of the polymers to be prepared, may be replaced entirely or partially with α,ω-di (hydroxy)di-organopolysiloxane oils of low viscosity, for example ranging from 5 to 200 mPa s at 25° C., which have a high hydroxyl radical content, for example from 3 to 14%.

R will be preferably a methyl group.

The compositions according to the invention may additionally advantageously include at least one silicone resin. These silicone resins are branched organopolysiloxane polymers which are well known and available commercially. They contain, per molecule, at least two different units chosen from those of formula R'''$_3$SiO$_{0.5}$ (M unit), R'''$_2$SiO (D unit), R'''SiO$_{1.5}$ (T unit) and SiO$_2$ (Q unit).

The radicals R''' are identical or different and are chosen from linear or branched alkyl radicals and vinyl, phenyl or 3,3,3-trifluoropropyl radicals. The alkyl radicals preferably contain from 1 to 6 carbon atoms inclusive. More particularly, the methyl, ethyl, isopropyl, tert-butyl and n-hexyl radicals may be mentioned as alkyl radicals R.

These resins are preferably hydroxylated and in this case have a hydroxyl group weight content of between 5 and 500 meq./100 g.

MQ resins, MDQ resins, TD resins and MDT resins may be mentioned as examples of resins.

In general, the composition may include one or more fillers chosen especially from reinforcing and packing fillers. These fillers will preferably be present in a proportion of 0 to 150 parts by weight of filler per 100 parts of reactive oil.

These fillers may be in the form of very finely divided products whose mean particle diameter is smaller than 0.1 μm. These fillers include in particular pyrogenic silicas and precipitated silicas; their specific surface is generally higher than 40 m$^2$/g and in most cases lies in the range 50–300 m$^2$/g.

These fillers may also be in the form of more coarsely divided products, of mean particle diameter greater than 0.1 μm. Examples of such fillers which may be mentioned in particular are ground quartz, diatomaceous silicas, calcined clay, titanium oxide of the rutile type, iron, zinc, chromium, zirconium and magnesium oxides, the various forms of alumina (hydrated or otherwise), boron nitride, lithopone and barium metaborate; their specific surface is generally lower than 30 m$^2$/g.

Fillers may have been surface-modified by treatment with the various organosilicon compounds usually employed for this application. Thus, these organosilicon compounds may be organochlorosilanes, diorganocyclopolysiloxanes, hexaorganodisiloxanes, hexaorganodisilazanes or diorganocyclopolysilazanes (French patents FR-A-1 126 884, FR-A-1 136 885, and FR-A-1 236 505 and British patent GB-A-1 024 234). In the majority of cases the treated fillers contain from 3 to 30 % of their weight of organosilicon compounds. The fillers may be treated in this way before or after they are incorporated into the formulation.

The fillers may consist of a mixture of a number of types of fillers of different particle sizes.

As is known per se, the composition may also include a polycondensation catalyst, especially a tin compound.

Similarly, the composition may also include unreactive oils which are known per se as plasticizers.

The invention is useful in particular in the manufacture of foam seals, especially in applications in a severe environment (high temperature, inclement weather, UV), such as seals for public lighting, motor vehicle headlamps, seals for plastic components under a motor vehicle bonnet and the like, as well as in the use of filling foams, especially for the building industry.

The invention also relates to foam objects, in particular foam seals, capable of being obtained from the compositions according to the invention, in particular after passing through a dynamic mixer or a static mixer.

Another subject of the present invention is a kit intended to produce an elastomer foam, including two separate parts, a first part including the cold-vulcanizable polycondensation elastomer formulation of the type described above and a second part including the carbonate according to the invention, preferably in the form of a paste with an α,ω-hydroxylated oil and preferably water. A filler may also be provided in this second part. The kit will preferably be presented in the form of a cartridge with two compartments, which is arranged so as to coextrude the first and second parts while mixing them (static mixer).

The present invention will now be described in greater detail below with the aid of nonlimiting examples of embodiment, with reference to the attached drawing, in which.

Figure 1:
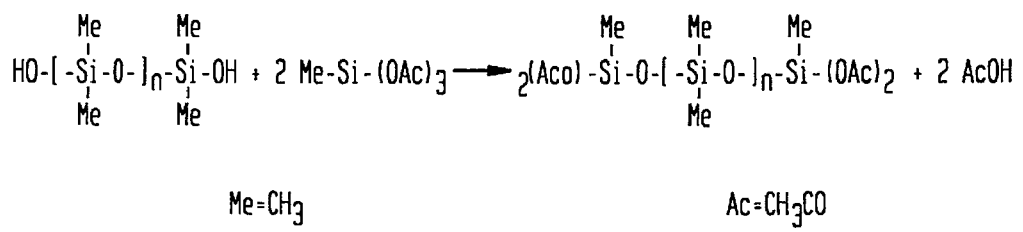
FIG. 1 shows the reaction of functionalization of a PDMS with a methyltriacetoxysilane and the crosslinking with moisture.
Figure 1:
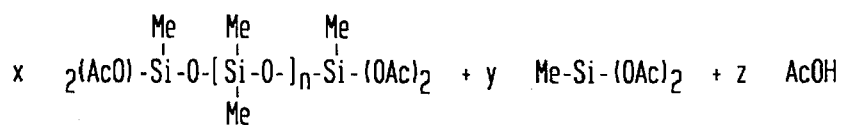
Figure 1:
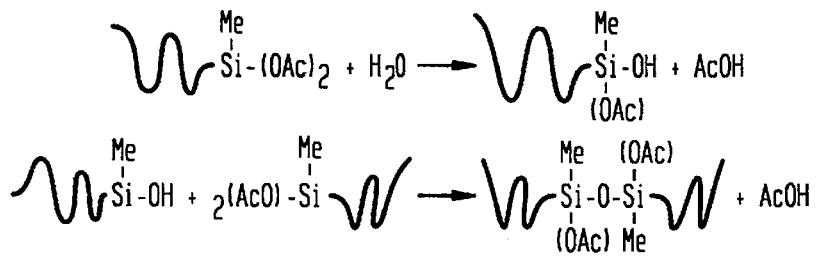

1) Reactions used:

FIG. 1 shows, by way of example, the general reaction of functionalization of a PDMS (polydimethylsiloxane) with the aid of a methyltriacetoxysilane used as crosslinking agent.

After this reaction a composition is obtained which appears in the "product storage" part in FIG. 1 and which consists of a polyacetoxyorganopolysiloxane, of acetoxysilane and of acetic acid. In general, this is the composition which is found in the ready-for-use cartridge. The last part of the figure describes, in a general manner, the crosslinking on contact with atmospheric moisture.

Figure 2:
FIG. 2 shows the mechanism of foaming and of acceleration of a cold-vulcanizable acetic elastomer using sodium bicarbonate.
Figure 2:
Figure 2:
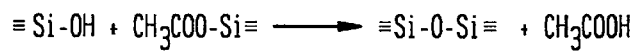
Figure 2:
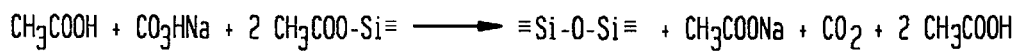

Reference is made to FIG. 2, which shows the mechanism of foaming and of acceleration of the cold-vulcanizable acetic elastomer using sodium bicarbonate. It is clearly seen that the action of sodium bicarbonate on the acetic acid present in the composition described in the "product storage" part of FIG. 1 produces the generation of water and of carbon dioxide; this water is then exploited for the crosslinking of the elastomer and hence the acceleration of this crosslinking, if it is compared with the action of atmospheric moisture alone. The commencement of the reaction can therefore take place in the presence of the acetic acid originally present in the composition obtained from the functionalization of the PDMS. In the absence of initial acetic acid, the acetic acid will be released by the crosslinking reaction. However, in the case where reactive oil is employed for forming a paste with sodium bicarbonate, this reactive oil can react directly with the acetoxysilane present in the composition originating from the functionalization of the PDMS and thus immediately generate a quantity of acetic acid which will make it possible to start the reaction with sodium bicarbonate.

2—Compositions: (in parts)

| Part A1: | |
|---|---|
| α,ω-Hydroxylated PDMS oil (viscosity 20 000 mPa s) | 100 p |
| α,ω-Hydroxylated PDMS oil (viscosity 14 000 mPa s) | 7 p |
| α,ω-Methylated PDMS oil (viscosity 500 mPa s) | 11 p |
| Pyrogenic silica (200 m$^2$/g) | 7 p |
| Pyrogenic silica treated in situ with hexamethyldisilazane (initial 150 m$^2$/g) | 7 p |
| Methyltriacetoxysilane | 3 p |
| Ethyltriacetoxysilane | 1 p |
| Di-n-octyltin dilaurate | 0.1 p |

| Part A2: | |
|---|---|
| α,ω-Hydroxylated PDMS oil (viscosity 20 000 mPa s) | 25 p |
| α,ω-Hydroxylated PDMS oil (viscosity 3 500 mPa s) | 75 p |
| Pyrogenic silica (200 m$^2$/g) | 13 p |
| Ground quartz | 80 p |
| Methyltriacetoxysilane | 2.3 p |
| Ethyltriacetoxysilane | 0.7 p |

| Part B 1x: | |
|---|---|
| α,ω-Hydroxylated PDMS oil (viscosity 20 000 mPa s) | 48 p |
| Pyrogenic silica (150 m$^2$/g) | 1 p |
| Sodium bicarbonate | 24 p |
| Water incorporated into the bicarbonate | x p |

| Part B 2x: | |
|---|---|
| α,ω-Hydroxylated PDMS oil (viscosity 20 000 mPa s) | 48 p |
| Pyrogenic silica (150 m$^2$/g) | 1 p |
| Sodium bicarbonate | 48 p |
| Water incorporated into the bicarbonate | x p |

The sodium bicarbonate employed in the examples had a particle size of between 20 and 30 μm and a purity of 99.5%.

3—Properties

EXAMPLE 1

Part A1 +part B 1x (x between 0.7 and 2.4 p).

The foaming and the crosslinking are obtained with the aid of a static mixer (type fitted with a chicane device ensuring an intercrossing of the streams of the parts introduced) at 23° C. in less than 5 minutes. The foams obtained are homogeneous with a closed-cell porosity and pore sizes of the order of 1 mm. The densities and Shore 00 hardness values obtained are reported in the table as a function of the water content of part B:

| Water content of part B × (p) | 0.7 | 1.1 | 1.7 | 2.4 |
|---|---|---|---|---|
| Relative density | 0.7 | 0.7 | 0.5 | 0.4 |
| Shore 00 hardness | 25 | 25 | 15 | 10 |

EXAMPLE 2

Part A1 +part B 2x (x=0.5 p)

The foaming and the crosslinking are obtained with the aid of a static mixer at 50° C. in 3 to 5 minutes. The cell structure is homogeneous, of the closed-cell type with pore sizes of the order of 300 μm. The properties are the following:

|                                   |          |
|-----------------------------------|----------|
| Relative density:                 | 0.7      |
| Shore A hardness:                 | 5        |
| Mechanical properties:            |          |
| Tensile strength                  | 0.1 mPa  |
| Break elongation                  | 500%     |
| Residual compression set:         |          |
| 30%/24 h/23° C.                   | <0.5%    |
| 50%/72 h/23° C.                   | <1%      |
| 30%/24 h/70° C.                   | <5%      |

EXAMPLE 3

Part A1 +part B 2x (x=1 p)

The foaming and the crosslinking are obtained with the aid of a static mixer at 23° C. in 10 minutes. The cell structure is homogeneous, of the closed-cell type with pore sizes of the order of 400 μm. The properties are the following:

|                                   |          |
|-----------------------------------|----------|
| Relative density:                 | 0.7      |
| Shore A hardness:                 | 5        |
| Mechanical properties:            |          |
| Tensile strength                  | 0.1 mPa  |
| Break elongation                  | 400%     |
| Residual compression set:         |          |
| 30%/24 h/23° C.                   | <1%      |
| 50%/72 h/23° C.                   | <2%      |
| 30%/24 h/70° C.                   | <20%     |

EXAMPLE 4

Part A2 +part B 2x (x=1 p)

The foaming and the crosslinking are obtained with the aid of a static mixer at 50° C. in 5 minutes. The cell structure is homogeneous, of the closed-cell type with pore sizes of the order of 600 μm. The properties are the following:

|                                   |          |
|-----------------------------------|----------|
| Relative density:                 | 0.6      |
| Shore A hardness:                 | 5        |
| Mechanical properties:            |          |
| Tensile strength                  | 0.6 mPa  |
| Break elongation                  | 200%     |
| Residual compression set:         |          |
| 30%/24 h/23° C.                   | 0%       |
| 50%/72 h/23° C.                   | 0%       |
| 30%/24 h/70° C.                   | <2%      |

What is claimed is:

1. An organopolysiloxane composition giving rise to elastomer foam, comprising:
   at least one poly-acyloxyorganopolysiloxane obtained by functionalization, with a polyacyloxysilane, of at least one reactive oil which is a polyhydroxylated polysiloxane intended to react in the presence of water to form the elastomer with formation of acid of formula R'COOH, in which R' denotes a hydrocarbon radical free from aliphatic unsaturation and which has from 1 to 15 carbon atoms,
   a blowing agent comprising at least one acidic or neutral carbonate of an alkali or alkaline-earth metal which, on reacting with the acid R'COOH, gives carbon dioxide and water; and
   optionally, water.

2. A composition according to claim 1, wherein the blowing agent is a bicarbonate.

3. A composition according to claim 2, wherein the blowing agent is sodium bicarbonate.

4. A composition according to claim 1, wherein the carbonate is hydrated, in a proportion of 0.01 to 20% by weight of water.

5. A composition according to claim 4, wherein the carbonate is hydrated, in a proportion of 0.1 to 3% by weight of water.

6. A composition according to claim 1, comprising from 1 to 50% by weight of carbonate relative to the total composition.

7. A composition according to claim 1, wherein the polyacyloxyorganopolysiloxane is obtained by functionalization of the reactive oil with a polyacyloxysilane in conditions such that the molar ratio of acyloxy functional groups of the polyacyloxysilane/hydroxyl functional groups of the reactive oil is higher than 1.

8. A composition according to claim 7, wherein the molar ratio of acyloxy functional groups of the polyacyloxysilane/hydroxyl functional groups of the reactive oil is between 2 and 10.

9. A composition according to claim 1, wherein the polyacyloxysilane is at least one compound corresponding to the formula:

$$R_p Si(OCOR')_{4-p}$$

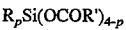

wherein the symbol R denotes a hydrocarbon radical containing from 1 to 8 carbon atoms which are optionally substituted by halogen atoms or cyano groups, and the symbol R' denotes a hydrocarbon radical free from aliphatic unsaturation, containing from 1 to 15 carbon atoms, and the symbol p being 0 or 1.

10. A composition according to claim 9, further comprising a compound of formula:

$$R''_2 Si(OCOR')_2$$

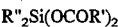

wherein R" is R or a tert-butoxy radical of formula: $(CH_3)_3C-O-$.

11. A composition according to any one of claims 1, wherein the polyacyloxysilane is methyl- and/or ethyltriacetoxysilane.

12. A composition according to claim 1, wherein the starting reactive oil is at least one α,ω-dihydroxydiorganopolysiloxane oil of viscosity between 200 and 1 000 000 mPa s at 25° C., consisting of a succession of diorganosiloxy units of $R_2SiO$ units, where the symbols R, which are identical or different, denote hydrocarbon radicals containing from 1 to 8 carbon atoms optionally substituted by halogen atoms or cyano groups and optionally with monoorganosiloxy units of formula $RSiO_{1.5}$ or siloxy units of formula $SiO_2$ in the proportion of not more than 2% relative to the diorganosiloxy units.

13. A composition according to claim 12, wherein R is methyl.

14. A composition according to claim 1, further comprising a hydroxylated silicone resin.

15. A composition according to claim 1, further comprising one or more fillers being reinforcing or packing fillers.

16. A composition according to claim 15, further comprising from 0 to 150 parts by weight of filler per 100 parts of reactive oil.

17. A composition according to claim 1, wherein the hydrated carbonate is in the form of a paste as a mixture with a reactive polyhydroxylated polysiloxane oil.

18. A composition according to claim 17, wherein the reactive oil is a α,ω-dihydroxydiorganopolysiloxane oil of viscosity between 200 and 1 000 000 mPa s at 25° C., consisting of a succession of diorganosiloxy units of $R_2SiO$ units, where the symbols R, which are identical or different, denote hydrocarbon radicals containing from 1 to 8 carbon atoms optionally substituted by halogen atoms or cyano groups and optionally with monoorganosiloxy units of formula $RSiO_{1.5}$ or siloxy units of formula $SiO_2$ in the proportion of not more than 2% relative to the diorganosiloxy units.

19. A composition according to claim 1, further comprising a metallic polycondensation catalyst.

20. A composition according to claim 1, wherein the carbonate has a particle size of between 5 and 100 μm.

21. A composition according to claim 1, wherein it is presented in two parts, a part A including the polyacyloxyorganopolysiloxane and a part B including the carbonate in the form of a paste with an α,ω-hydroxylated oil.

22. A seal, made of elastomer foam, being obtained by using a composition according to claim 1.

23. Kit for delivering a composition according to claim 21, comprising a cartridge with two compartments, each compartment including a part of the composition, the cartridge being arranged so as to coextrude these two parts while mixing them.

* * * * *